United States Patent
Nehowig et al.

(10) Patent No.: US 9,704,310 B2
(45) Date of Patent: Jul. 11, 2017

(54) MULTI-MODE VEHICLE COMPUTING DEVICE SUPPORTING IN-CAB AND STAND-ALONE OPERATION

(75) Inventors: Kelly R. Nehowig, Maple Grove, MN (US); Ronald Edward Konezny, Shorewood, MN (US)

(73) Assignee: TRIMBLE NAVIGATION LIMITED, Sunnyvale, CA (US)

( * ) Notice: Subject to any disclaimer, the term of this patent is extended or adjusted under 35 U.S.C. 154(b) by 613 days.

(21) Appl. No.: 13/361,184

(22) Filed: Jan. 30, 2012

(65) Prior Publication Data

US 2012/0194679 A1    Aug. 2, 2012

Related U.S. Application Data

(60) Provisional application No. 61/438,250, filed on Jan. 31, 2011.

(51) Int. Cl.
*H04N 7/18* (2006.01)
*G07C 7/00* (2006.01)
*G06F 1/16* (2006.01)
*G07C 5/08* (2006.01)

(52) U.S. Cl.
CPC ............ *G07C 7/00* (2013.01); *G06F 1/1626* (2013.01); *G06F 1/1632* (2013.01); *G07C 5/085* (2013.01)

(58) Field of Classification Search
CPC ....... G06F 1/1626; G06F 1/1632; G07C 7/00; G07C 5/085
USPC .................................... 348/148; 710/16, 304
See application file for complete search history.

(56) References Cited

U.S. PATENT DOCUMENTS

| | | | |
|---|---|---|---|
| 6,823,249 B2* | 11/2004 | Moore et al. | 701/50 |
| 2006/0122770 A1* | 6/2006 | Sasano | 701/210 |
| 2006/0161713 A1 | 7/2006 | Belady | |
| 2006/0200008 A1* | 9/2006 | Moore-Ede | 600/300 |
| 2007/0038338 A1* | 2/2007 | Larschan et al. | 701/2 |
| 2007/0219862 A1* | 9/2007 | Casella et al. | 705/14 |
| 2008/0016207 A1* | 1/2008 | Cheng | 709/224 |
| 2008/0040007 A1* | 2/2008 | Bertsch et al. | 701/50 |
| 2008/0304705 A1* | 12/2008 | Pomerleau et al. | 382/103 |
| 2010/0039254 A1* | 2/2010 | Cooper et al. | 340/539.11 |
| 2010/0085694 A1* | 4/2010 | Nielsen et al. | 361/679.08 |

(Continued)

OTHER PUBLICATIONS

"Off-line fuel monitor & GPS tracker". Mar. 2010, pp. 1-3. https://web.archive.org/web/20100304070235/http://www.wagencontrol.com/fuel_monitor.*

(Continued)

*Primary Examiner* — Zhihan Zhou
(74) *Attorney, Agent, or Firm* — Hollingsworth Davis, LLC

(57) ABSTRACT

Techniques involving connecting an in-cab computing device to an onboard computing device mounted in a vehicle. Vehicle-related information may be communicated between the in-cab computing device and onboard computing device while the in-cab computing device is connected to the onboard computing device. Techniques involve facilitating disconnection of the in-cab computing device from the onboard computing device and operating the in-cab computing device in a stand-alone mode, and facilitating reconnection of the in-cab computing device to the onboard computing device to resume operations between the in-cab computing device and onboard computing device.

11 Claims, 9 Drawing Sheets

(56) References Cited

U.S. PATENT DOCUMENTS

| | | | |
|---|---|---|---|
| 2010/0145609 A1* | 6/2010 | Boss | G06Q 30/018 |
| | | | 701/22 |
| 2010/0214130 A1* | 8/2010 | Weinmann et al. | 340/945 |
| 2011/0249394 A1* | 10/2011 | Nielsen et al. | 361/679.41 |
| 2012/0166346 A1* | 6/2012 | Machlab et al. | 705/317 |
| 2012/0232747 A1* | 9/2012 | Miners et al. | 701/33.9 |

OTHER PUBLICATIONS

Burger et al. "Supplemental Electronic In-Cab Truck Displays an Inventory of Devices and Approaches to Their Evaluation." DOT HS 807 410 Final Report, Feb. 1989, pp. 1-244.*

Apr. 30, 2015, Office Action dated Apr. 30, 2015 from Canadian Application No. 2,766,357, 5 pages.

* cited by examiner

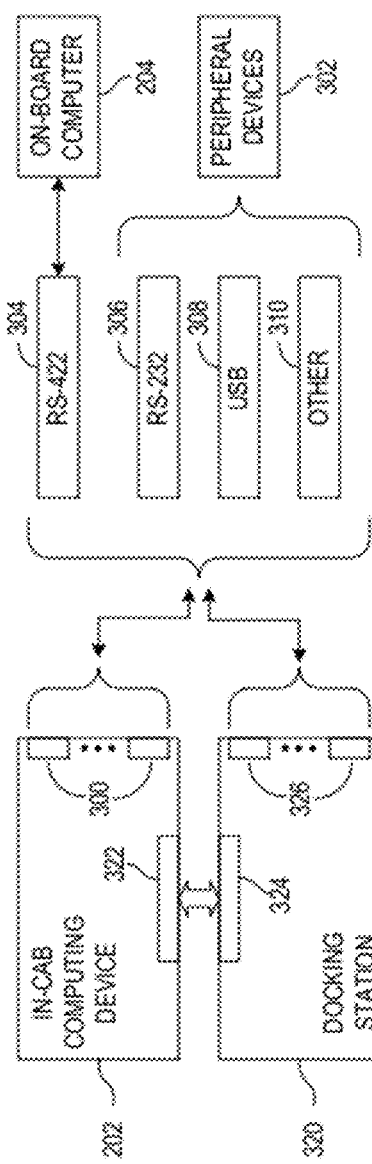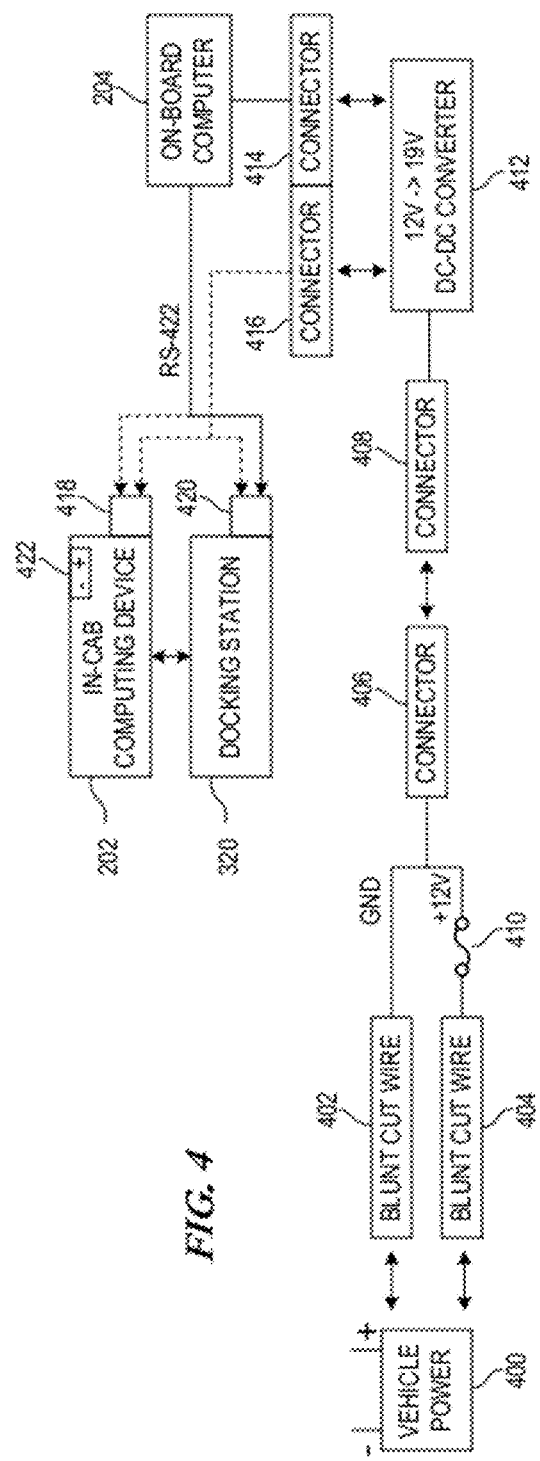

MULTI-MODE VEHICLE COMPUTING DEVICE SUPPORTING IN-CAB AND STAND-ALONE OPERATION

RELATED APPLICATIONS

This application claims the benefit of Provisional Patent Application No. 61/438,250, filed on Jan. 31, 2011, to which priority is claimed pursuant to 35 U.S.C. §119(e) and which is incorporated herein by reference in its entirety.

SUMMARY

Embodiments described in this disclosure are generally directed to a portable computing device removably connectable to a vehicle onboard computer. Connections may be made directly or by way of a docking cradle. Transportation-related tasks can thus be conducted on a single device which serves as both the user interface to the onboard computing device, as well as a detachable/portable computing device to execute other business related functions.

According to embodiments described herein, techniques methods of the disclosure involve connecting an in-cab computing device to an onboard computing device mounted in a vehicle. Vehicle-related information may be communicated between the in-cab computing device and onboard computing device while the in-cab computing device is connected to the onboard computing device. Techniques involve facilitating disconnection of the in-cab computing device from the onboard computing device and operating the in-cab computing device in a stand-alone mode, and facilitating reconnection of the in-cab computing device to the onboard computing device to resume operations between the in-cab computing device and onboard computing device.

According to another representative embodiment, a system includes an onboard computing device and an in-cab computing device. The onboard computing device includes a first processor configured to collect vehicle-related data, and includes a transceiver configured to communicate at least some of the vehicle-related data over one or more networks to one or more destination entities. The in-cab computing device includes at least one disconnectable connection to the onboard computing device to communicate information between the in-cab computing device and the onboard computing device, and a second processor configured to execute one or more applications independently of the onboard computing device when disconnected from the onboard computing device.

This summary introduces representative concepts that are further described in the ensuing description. The summary is not intended to identify essential features of current or future claimed subject matter, nor is it intended to be used to limit the scope of the claimed subject matter.

BRIEF DESCRIPTION OF THE DRAWINGS

FIG. 3 is a block diagram illustrating a representative manner for connecting the in-cab computing device to other components in the representative system;

FIG. 4 illustrates a representative example of powering the onboard computing device and/or in-cab computing device;

DETAILED DESCRIPTION

In the following description, reference is made to the accompanying drawings that depict representative implementation examples. It is to be understood that other embodiments and implementations may be utilized, as structural and/or operational changes may be made without departing from the scope of the disclosure. Throughout the disclosure, like reference numbers are used to identify like components, blocks and other items where appropriate.

The disclosure is generally directed to transportation-related activities in transportation industries, such as in the trucking industry. While the disclosure is directed primarily to trucks and fleets of trucks, the principles described herein are equally applicable to other vehicle types.

Implementations may be used in connection with vehicles ranging from a single vehicle to large fleets of vehicles having different characteristics. Traveling vehicles equipped with communication devices are configured to at least communicate data to a data center or other central office system. While the vehicles and/or drivers need not have any association with one another, the vehicles may be part of one or more fleets of vehicles, such as in the trucking industry. The central office may serve as a fleet management system in which the trucks or other vehicles communicate, regardless of which fleet, if any, they may be associated with. The fleet management system delivers an array of services and solutions utilizing a fleet of mobile communication devices and in-cab computing devices in the vehicles.

Figure 1:
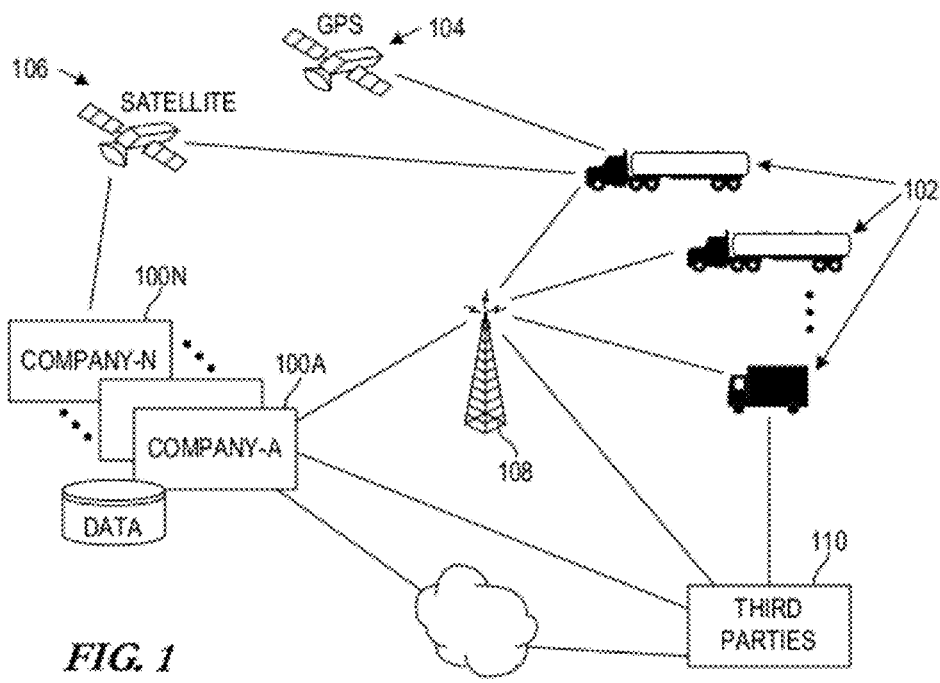
FIG. 1 is a block diagram illustrating a representative environment in which the principles described herein may be practiced.

As noted above, the principles and representative implementations described herein may be implemented in any vehicle, whether an individual vehicle or associated with one or more fleets of vehicles. For purposes of illustration and not of limitation, FIG. 1 generally illustrates a representative use of in-cab computing devices and their cooperative operation with on-board computers (OBC) in a fleet of trucks to facilitate communication with a central office and/or other facility. The block diagram of FIG. 1 therefore illustrates a representative environment in which the principles described herein may be practiced. The example of FIG. 1 assumes that one or more entities, labeled company-A 100A through company-N 100N manages a fleet of one or more vehicles. Representative trucks 102 and/or other vehicles are associated with company-A 100A in the illustrated embodiment. The company-A 100A may track locations of the vehicles 102 using location services, such as cellular triangulation, global positioning system (GPS) 104 or other satellite 106 tracking mechanisms, and/or other manners of tracking the movement and location of the fleet. Other information may be gathered by company-A 100A (e.g. a dispatch company) that may be provided by the vehicles 102 to the company-A 100A by any desired means, such as data transmission via the cellular infrastructure represented by the cellular base station 108. The information may be provided in other manners, such as via satellite 106 and/or other data delivery mechanisms. Company-A 100A may utilize the information in its fleet dispatch operations. Information concerning the vehicles 102 may instead or additionally be collected by one or more third parties 110, such as fuel card providers, mobile communication companies, etc.

Services and applications may be made available, for example, for the companies 100A-100N and/or the vehicle 102 operators. Companies 100A-100N may provide dispatch services to their fleet, and may provide a software interface that drivers of the vehicles 102 may access. Information may alternatively or additionally be provided by way of a mobile communication vendor(s), represented in FIG. 1 as a third party 110. Companies having a fleet of vehicles, or independently owned vehicles may utilize services of a mobile communication vendor 110 such as PeopleNet™ Communications Corporation. With onboard computing (not shown) on such vehicles 102 to obtain information such as GPS or other location data, electronic engine data, onboard event recording information and the like, a mobile communication vendor 110 can collect information that may then be provided directly, and/or by way of services/applications, for use by the companies 110A-110N and/or vehicles 102.

Figure 2:
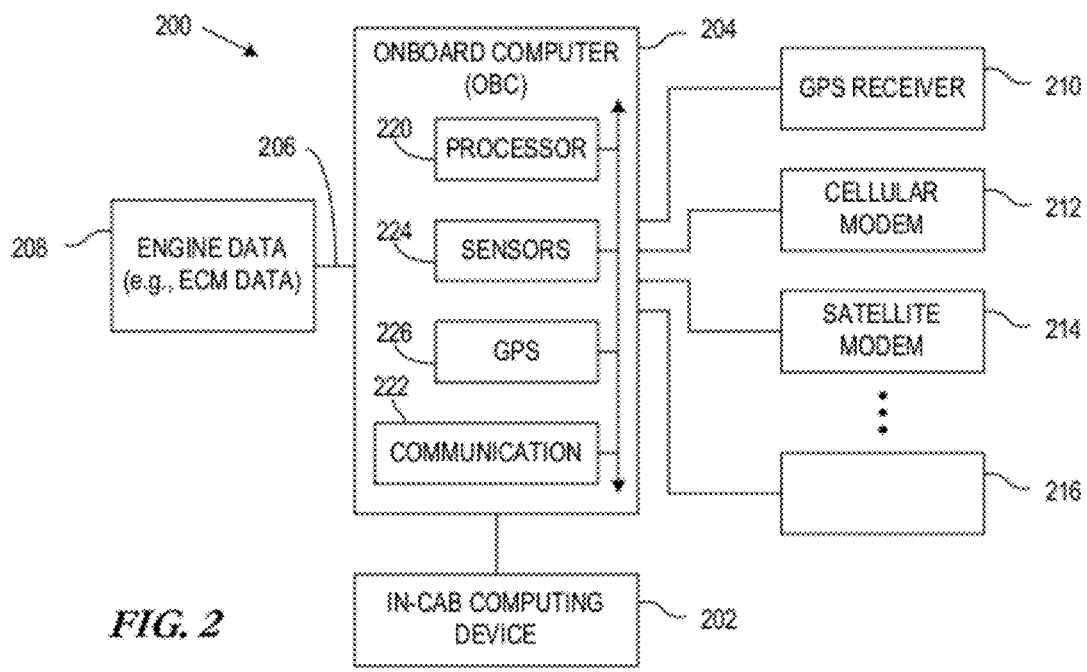
FIG. 2 is a block diagram illustrating a representative vehicle system utilizing an in-cab computing device.

In accordance with the disclosure, an in-cab computing solution facilitates the use of such services, applications and other functionality. Embodiments of an in-cab computing device include cooperative communication with the onboard computer to provide travel-related functionality as well as other computing functionality to assist vehicle drivers. FIG. 2 is a block diagram illustrating a representative vehicle system 200 utilizing an in-cab computing device 202. In one embodiment, the onboard computer (OBC) 204 serves as the communications hub for both wireless communication, and data from the truck or OBC to the in-cab computing device 202. Thus, the OBC 204 may provide mobile communications, onboard computing, fleet management, etc. The OBC 204 can facilitate multi-network communications, such as dual-mode wireless-satellite communications. In one embodiment, Global Positioning System (GPS) technology is employed at the OBC 204, which in one embodiment is provided by wide area augmentation system (WAAS) technology. In one embodiment the OBC exhibits an open development platform for rapid and custom development of new applications. OBC 204 connections may include, for example, universal serial bus (USB) connectors and vehicle diagnostics connections (e.g. J1708, J1909, CAN, OBDII, etc.).

More particularly, as shown in FIG. 2, one embodiment of the system 200 includes the OBC 204 that represents an embedded system having its own processor and associated processing capabilities. The OBC 204 may connect to an engine data bus 206 that provides engine data 208. For example, vehicles such as commercial trucks typically include an engine control module (ECM) or other electronic control unit that is associated with the engine of the respective vehicle. In addition to assisting with operational functions such as controlling fuel mixture, timing, idle speed, etc., ECMs are capable of providing the data to which they are privy to. For example, an ECM includes a data bus to provide engine data such as RPM, speed, calculated miles per gallon (MPG) of fuel consumed, miles traveled, engine idle time, engine hours, door lock status, windshield wiper status, and the like. The OBC 204 may obtain such engine data 208 for processing and/or communication to other entities.

The OBC 204 may also be connected to a Global Positioning System (GPS) receiver 210 and/or other location technology receiver. GPS and other analogous technologies can identify the location of the GPS receiver, which is co-located with the truck or other vehicle in the present disclosure. Thus, latitude/longitude coordinates, landmarks or other location identifiers can be obtained by the OBC 204 by way of the GPS receiver 210. This enables the location, and continuous route if desired, to be tracked by the driver of the truck as well as an external entity such as the dispatch company responsible for managing fleet transportation.

In one embodiment, a cellular modem 212 is provided to communicate at least data, and in some embodiments voice as well, with other entities such as the driver's company, a dispatch company, a mobile communications company, etc. The cellular modem 212 may be configured to communicate via CDMA technology, GSM/GPRS technology or any other similar technology. Other communication devices may also or alternatively be provided, such as a satellite modem 214 or other 216 communication receiver or transceiver.

The depicted OBC 204 is representative of what may reside in each vehicle monitored in accordance with embodiments of the disclosure. In one embodiment the OBC 204 is powered by the power system of the vehicle and includes a processor(s), such as a microprocessor 220. Processor 220 is coupled to communication module 222 which is configured to cooperatively communicate with a messaging module of a central communication center or other entity by way of the cellular modem 212, satellite modem 214 and/or other modem 216. For example, the OBC 204 may attempt to communicate by cellular modem 212 first, and loss of sufficient cellular signal strength may automatically or manually activate data communications via the satellite modem 214 or other 216 communication mechanism. The OBC 204 may also include various sensors 224 to provide information not otherwise provided by the engine data. GPS circuitry 226 may also be provided to manage GPS information received from the GPS receiver 210.

In one embodiment, information relating to the engine data 208, location data obtained from the GPS receiver 210 and other information is provided to a data center of a company, dispatch center, mobile communication company and/or other entity by way of data call records. Such data call records can contain an enormous amount of information collected by the OBC 204 regarding cell signal strength, GPS location, Service Identifier (SID) or analogous cellular network identifier, channel, baud, data payload, and duration, for example. Call records may include vehicle data for each fleet vehicle that communicates with the central office. Vehicle data may include at least identification data that uniquely identifies each OBC 204 and location data indicative of a geographic location of each vehicle at the time of data transmission initiation. The vehicle data associated with each data transmission is stored locally at each vehicle as a call record or other data packet, and transmitted to the central office on a repeated and/or prompted basis.

In accordance with the present disclosure, the OBC 204 is also coupled to the in-cab computing device 202. The in-cab computing device 202 provides a user interface for the vehicle operator, as well as processing capabilities for conducting communications, executing applications, and the like. Representative examples of in-cab computing devices 202 are described more fully below.

FIG. 3 is a block diagram illustrating a representative manner for connecting the in-cab computing device 202 to other components in the representative system. The in-cab computing device 202 may be directly coupled to various devices, including the onboard computer 204, by way of connectors 300 associated with the in-cab computing device 202. For example, connectors 300 may enable connection to the onboard computer 204, peripheral devices 302, sensors and/or other items via RS-422 connections 304, RS-232 connections 306, USB connections 308, and other 310 types of connections. In one embodiment, the in-cab computing device 202 is mounted in the vehicle cab in a fixed manner, whereby the appropriate connections 304-310 may be directly coupled to the connectors 300 on the in-cab computing device 202. In another embodiment, the in-cab computing device 202 may be removable, and the connections 304-310 are connected and disconnected directly from the in-cab computing device 202. This embodiment provides a portable solution that enables the in-cab computing device 202 to be removed from the cab, or at least from its mounted location, for other uses.

In another embodiment, portability of the in-cab computing device 202 is enhanced through the use of a docking station 320. Both the in-cab computing device 202 and the docking station 320 may respectively include connectors 322, 324 to facilitate connecting the in-cab computing device 202 to the docking station 320. A RAM-ball type of mount is utilized in one embodiment. The docking station 320 may include a key lock for a fixed mount, and peripheral devices are supported when plugged into the docking station ports 326. In this manner, the onboard computer 204, peripheral devices 302 and other items may be coupled to the in-cab computing device 202 by way of the docking station 320.

When used in-cab, the in-cab computing device 202 may receive power directly, or by way of the docking station 320, from the vehicle battery. A representative example of a power implementation is depicted in FIG. 4. The vehicle power 400 may be, for example, a 12-volt automotive battery in the truck or other vehicle. The power may be wired, such as via blunt cut wires 402, 404 to connectors 406, 408. A fuse(s) 410 may be used, such as along the +12-volt lead. The connectors 406, 408 enable connection of the vehicle power wires 402, 404 to be connected to a DC-DC converter 412, which in the illustrated embodiment is a 12V-to-19V DC-DC converter. The converted DC power is provided via connector 414 to the OBC 204, and to the in-cab computing device 202 either directly or by way of the docking station 320. For example, a connector 414 may be used to provide power to the OBC 204. As another example, the connector 416 may be used to directly provide power to a connector 418 on the in-cab computing device 202, or to the in-cab computing device 202 by way of connector 420 associated with docking station 320. The RS-422 (or other interface) enables communication between the in-cab computing device 202 and the onboard computer 204.

As the in-cab computing device 202 may be used independently from the vehicle operations, it includes a battery 422. When disconnected from the vehicle power 400, the battery 422 can provide power to the in-cab computing device 202 for portable use.

Figure 5:
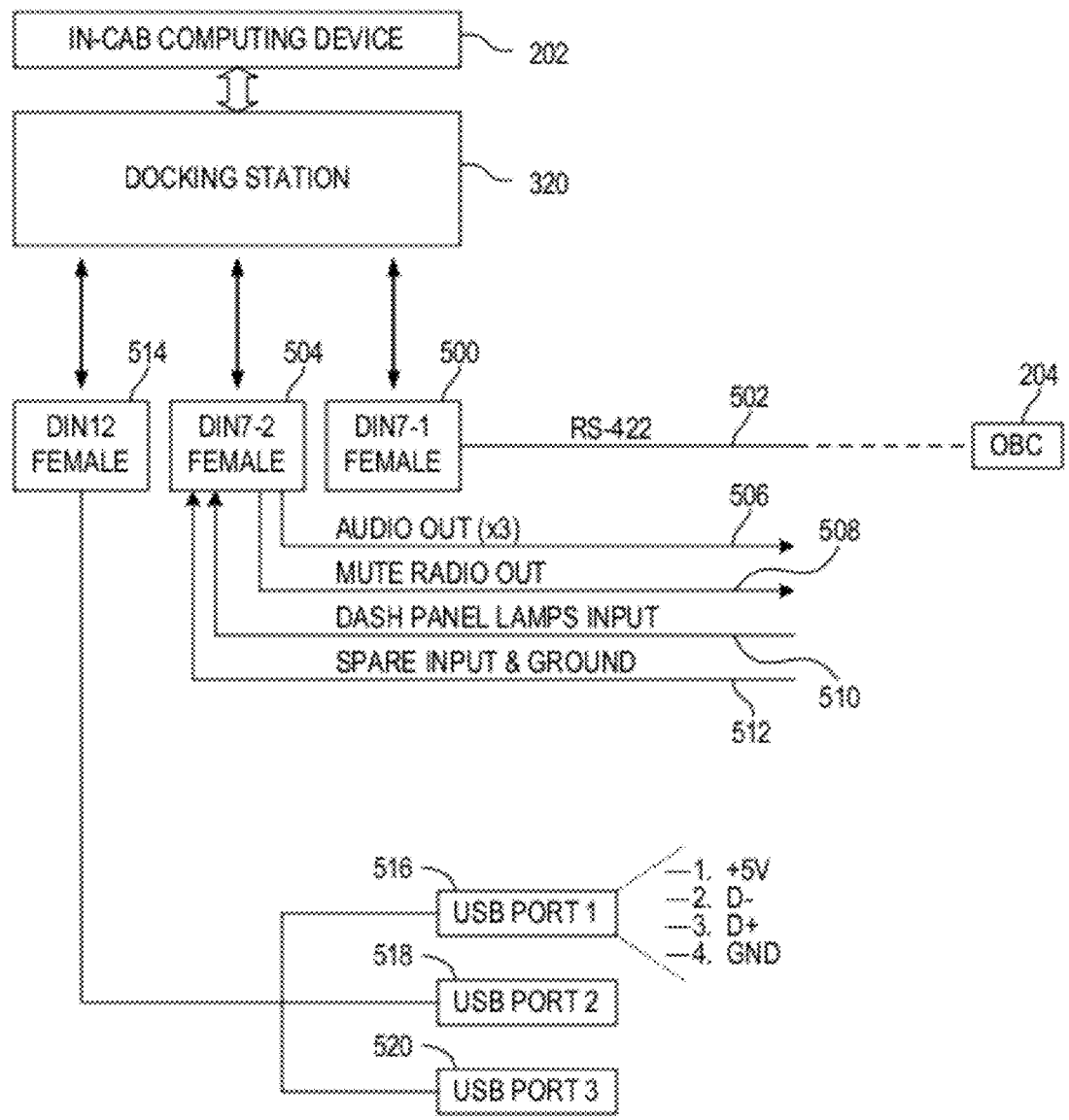
FIG. 5 depicts a more particular example of connectors and signals that may be used in connection with the in-cab computing device.

FIG. 5 depicts a more particular example of connectors and signals that may be used in connection with the in-cab computing device 202. In the example of FIG. 5, it is assumed that a docking station 320 is used, although the interfaces could be directly coupled to the in-cab computing device 202. In this example, the docking station includes a connector 500 that is used to at least provide an RS-422 interface 502 to communicate with the OBC 204. As noted in FIG. 4, power may also be provided via the connector 500.

The docking station 320 also includes one or more connectors 504 that provide other inputs and outputs. For example, connector 504 provides an audio out interface 506, such as stereo left, stereo right, and stereo ground. Thus, external speakers may be coupled to the docking station 320 and ultimately the in-cab computing device 202. Similarly, a mute output 508 may be provided, as well as dash panel lamps input 510 and possibly spare inputs and ground 512. Another connector(s) 514 may provide one or more USB ports, such as USB ports 516, 518, 520. In one embodiment, the connector 514 is connected to the USB ports 516, 518, 520 via a USB pigtail harness.

Any number or type of connectors may be utilized on the docking station 320 and/or in-cab computing device 202. The connectors, interfaces and signals described in connection with FIG. 5 are provided for purposes of illustration only.

The portability of the in-cab computing device provides for great flexibility of use when the in-cab computing device is removed from the docking station or otherwise disconnected from the OBC and other components. While traveling and connected to the onboard computer, the in-cab computing device operates as a user interface for the OBC functionality, as well as providing other computing functions. When the in-cab computing device is disconnected from the OBC, it can still execute applications. Thus, a single device can be used to perform both travel-related functions, and industry-related applications that are not dependent upon connection to an OBC or other vehicle components. The in-cab computing device thus serves as both a cab-based device and a hand-held device to aggregately serve the needs of drivers and fleet management.

In one embodiment, the system is capable of preserving travel-related data when the in-cab computing device is disconnected from the OBC. For example, a driver may have an in-cab computing device 202 connected to a docking station 320 as he is driving. The in-cab computing device 202 may have business rules software that uses data from the onboard computer 204 relating to, for example, location information, odometer readings, etc. The business rules software may dictate how certain information will be captured, such as for driver's logs. For example, information such as the identity of the driver, GPS position, and the like may be utilized. In many cases, state Department of Transportation (DOT) rules may vary from state to state, and vary from federal DOT rules. When positioning systems indicate that boundaries have been crossed, the business rules may need to be changed to comply with that state or other area's rules.

Therefore, connection to the OBC in such situations may be important to continue to receive information from the OBC. However, the driver may remove the in-cab computing device 202 from the docking station 320 to perform other tasks, whether the vehicle is still in route or stopped. The OBC 204 is, however, still collecting data at such times, but the in-cab computing device 202 is not in a position to receive that data when disconnected. In one embodiment, the OBC 204 recognizes that the in-cab computing device 202 has been disconnected, in which case accumulated data will be stored until the in-cab computing device 202 has been reconnected. When the in-cab computing device 202 is reconnected, a "playback mode" is effected that causes the data to be presented to the reconnected in-cab computing device 202 in the order it originally occurred, whereby the in-cab computing device 202 processes the buffered information just as if the events were happening as they actually occurred. In this manner, driver's logs and other applications can be "caught up" such that the logs are complete and accurate when the in-cab computing device has been reconnected.

Figure 6:
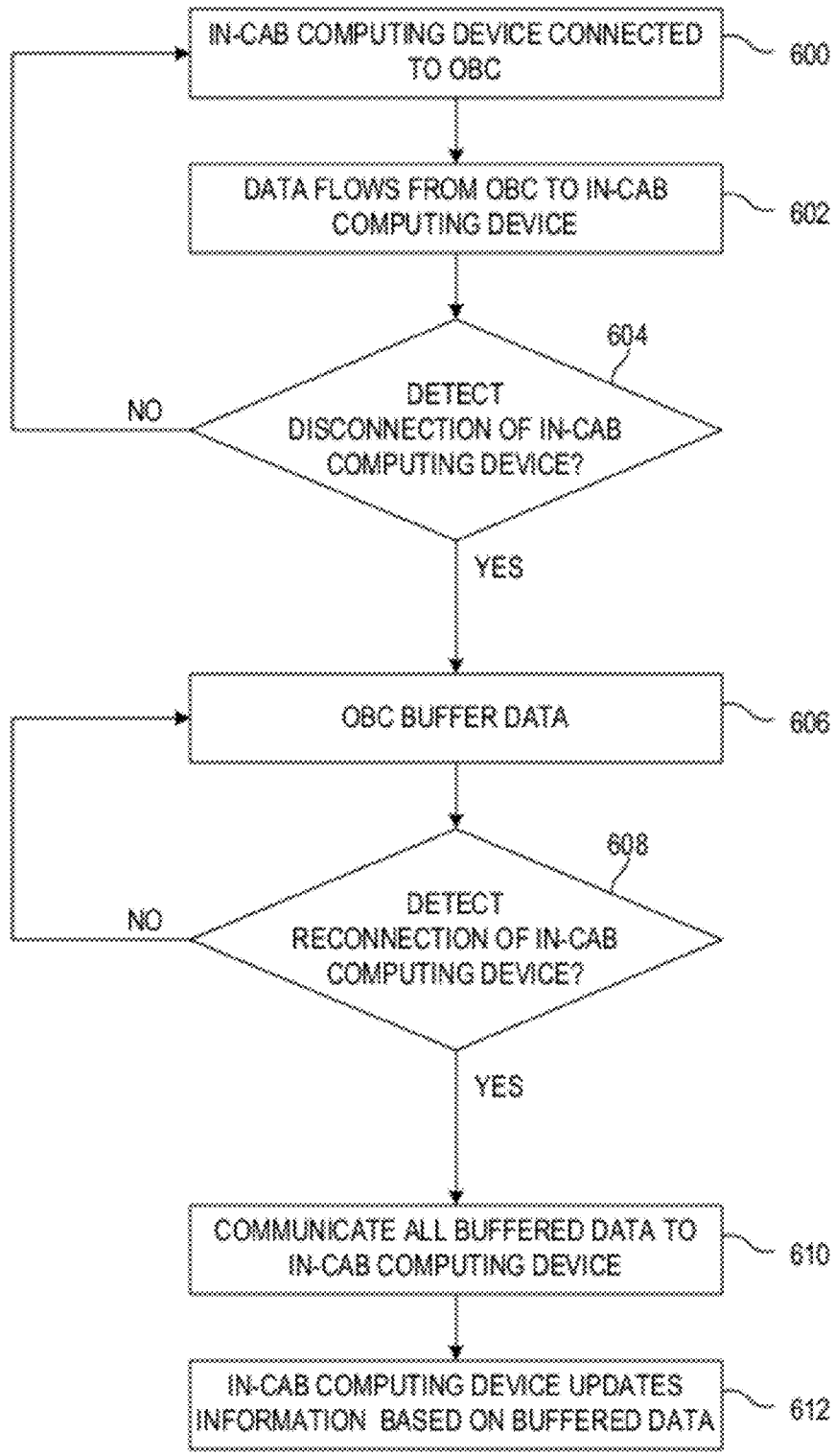
FIG. 6 is a flow diagram illustrating an exemplary method for managing OBC data when the in-cab computing device has been disconnected from the OBC.

FIG. 6 is a flow diagram illustrating an exemplary method for managing OBC data when the in-cab computing device has been disconnected from the OBC. In this representative example, it is assumed that the in-cab computing device is connected to the OBC as shown at block 600. As shown at block 602, the data collected by the OBC is provided from the OBC to the in-cab computing device. Meanwhile, the OBC monitors for a disconnection of the in-cab computing device from the OBC. If such a disconnection is not detected as determined at decision block 604, the data continues to flow from the OBC to the in-cab computing device as shown at block 602. Otherwise, if it is detected 604 that the in-cab computing device has been disconnected, the OBC queues or otherwise buffers the data as shown at block 606. The data may be buffered in memory, cache, permanent storage or any other storage mechanism. In one embodiment, the data is buffered or queued in the order that the data occurred, so that the data can eventually be provided to the reconnected in-cab computing device in the order that it occurred.

When the in-cab computing device has been disconnected 604 and OBC data is being buffered 606, the OBC monitors for a reconnection of the in-cab computing device. If no such reconnection is detected 608, the OBC data continues to be queued. Otherwise, if a reconnection is detected 608, one embodiment involves communicating all of the buffered data to the reconnected in-cab computing device as shown at block 610. With the buffered data now provided to the in-cab computing device, the in-cab computing device can update 612 any information (e.g. driver's logs, etc.) with the buffered data.

It should be recognized that the in-cab computing device may alternatively or additionally notify the OBC when it is to be detected. For example, a user interface may enable a driver to indicate that the in-cab computing device is to be disconnected, which can trigger the data buffering by the OBC. It should also be recognized that detection of the connection and/or reconnection of the in-cab computing device can be performed in any known fashion. For example, a grounded signal when connected can float to a different logic level when disconnected, and such signal can be monitored by the processor on the OBC (or alternatively the in-cab computing device) to detect when the in-cab computing device has been disconnected. Such a signal(s) can be continuously or periodically monitored, may trigger an interrupt, etc.

Thus, as noted by the example of FIG. 6, the in-cab computing device may be operated in different modes. One mode involves operation while the in-cab computing device 202 is connected to the OBC, such as when mounted to the docking cradle in a truck. Another mode involves operation while the in-cab computing device is disconnected from the OBC and any docking cradle. In one embodiment, the system is designed such that the in-cab computing device is normally connected 600 to the OBC. While the vehicle is moving, data flows 602 from the OBC to the in-cab computing device, such as ECM data and the like. For example, data obtained by the OBC and/or provided by the OBC to the in-cab computing device may include GPS readings, odometer readings, RPM, speed, calculated miles per gallon (MPG) of fuel consumed, engine idle time, engine hours, door lock status, windshield wiper status, etc. The in-cab computing device uses this data in one or more applications, such as business rules software to determine electronic log reporting for DOT reporting/compliance, routing data, and numerous other reports that may be important to the dispatching office or other entity.

When the in-cab computing device is disconnected from the OBC, it is essentially operating in a portable mode. In this case, the data from the OBC containing positioning information and other vehicle data cannot be communicated to the in-cab computing device. This information may affect the accuracy of electronic log (e.g. eLog) reporting, accuracy of the dispatching information communicated back to the dispatch office, etc. Thus, as noted above, one embodiment involves detecting 604 when the in-cab computing device is disconnected from the OBC, and then directs the OBC to queue 606 (or otherwise temporarily hold/store) the vehicle data in its memory until, as determined at block 608, the in-cab computing device is reconnected to the OBC. At that point, the queued data is communicated 610 to the in-cab computing device from the OBC so that the in-cab computing device can update its rules software and/or any other software to reflect the current condition (e.g. vehicle position, odometer readings, etc.).

Figure 7A:
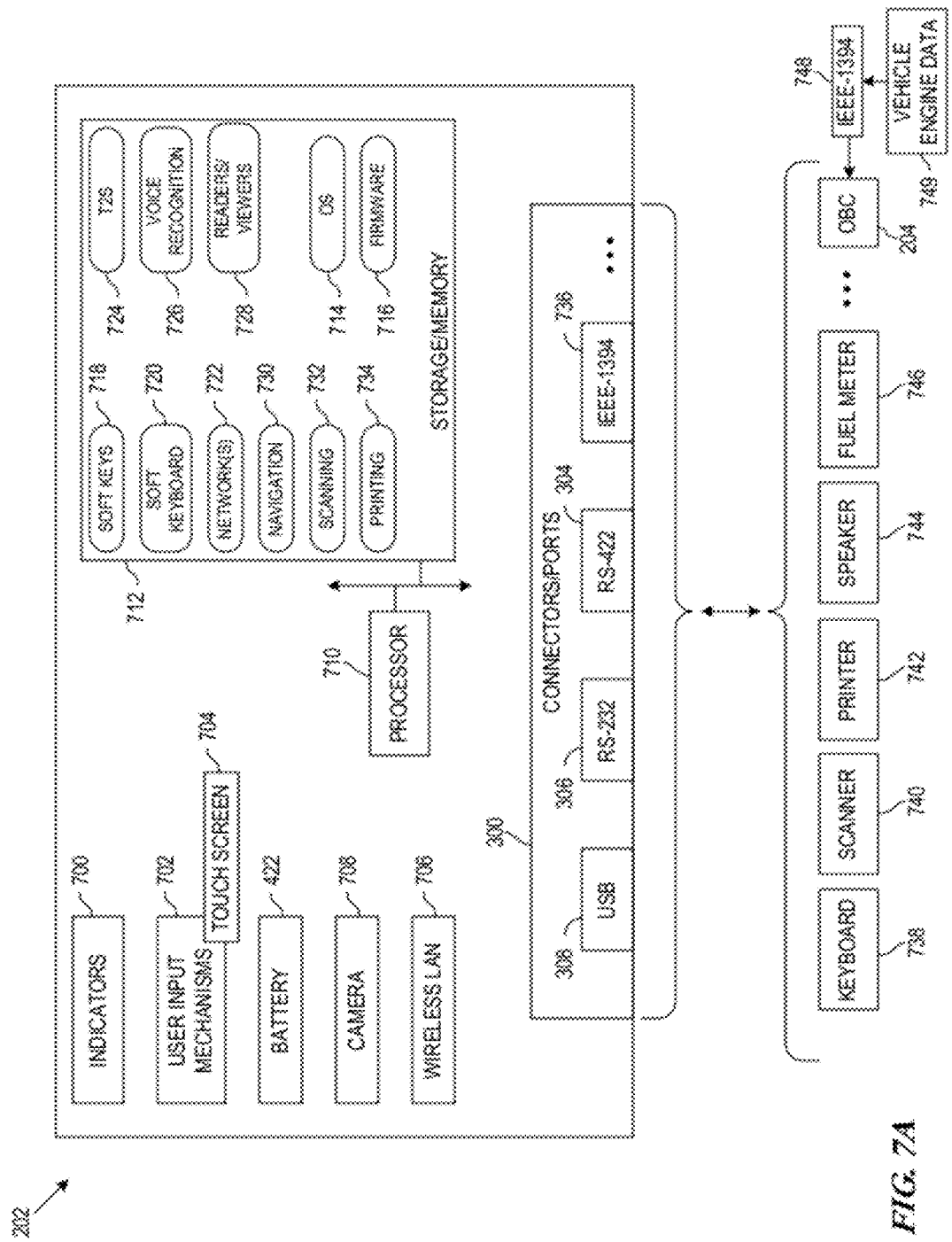
FIG. 7A is a block diagram illustrating various representative features of an in-cab computing device according to embodiments of the invention.

FIG. 7A is a block diagram illustrating various representative features of an in-cab computing device 202 according to embodiments of the invention. It should be recognized that the features of FIG. 7A are representative of features associated with an in-cab computing device according to the invention. The features identified in FIG. 7A do not represent necessary or essential features, nor do the identified features represent an exhaustive list of the features operable via the in-cab computing device.

An in-cab computing device according to the present disclosure has many available features. It may provide an end-to-end solution, including hardware, network capabilities, software and applications/services in a single device. While it may be utilized in any vehicle, some embodiments focus on transportation and commercial vehicles. A set of solutions with an open platform is provided in one embodiment, such as web services, application programming interfaces (APIs), platforms, partner ecosystems, etc. The in-cab computing device may thus be implemented as an in-cab, advanced tablet-based PC to enable mobile communications, messaging, forms processing, vehicle diagnostics, driver behavior reporting, etc. Further, the in-cab computing device may serve as an open computing platform for customers and third party partners on which to develop custom applications.

Looking to FIG. 7A, representative features of the in-cab computing device 202 include a battery 422 which enables the device 202 to be used as a portable and/or hand-held device. The device 202 may include indicators 700 such as LEDs or other lights. For example, a truck driver may need visibility to statuses, such as power on/off status, cellular signal strength, message(s) available or waiting, WLAN power, Bluetooth power, battery strength or charge status, disk access status, etc.

The in-cab computing device 202 may include user input mechanisms 702, including any one or more of buttons, switches or toggles, scrolling mechanisms, pointing devices, joystick, etc. One particular type of user input mechanism 702 is separately identified in FIG. 7A as the touchscreen 704, which may be implemented to enable the user to make selections graphically.

The device 202 may also include network functionality, such as a wireless local area network (WLAN) 706 or other "wifi" mechanisms. For example, a WLAN transceiver may be provided to enable the device 202 to communicate wirelessly with a proximity network, whether the device 202 is connected to the OBC 204 or is being used in its portable mode. As an example, a driver may arrive at a destination where a shipment is to be dropped. The driver may disconnect the in-cab computing device 202 and bring the device 202 into the destination company's office. The user can obtain Internet access, e-mail access, and/or other access by connecting to a local WLAN. WLAN hardware 706 and associated software 722 may be provided, as well as an internal antenna (not shown).

The device 202 may also include a camera 708. As an example, a driver may disconnect the in-cab computing device 202 and use a local application for a safety inspection. For example, a driver may perform a daily or pre-embarkation safety inspection on his/her truck. In the past, drivers would make such an inspection with clipboard and paper. Such inspection may include, for example, examination of whether a cover is secure, tire inflation status, tail light and other indicator light status, etc. With the in-cab computing device 202, a digital form may be presented to enable recordation of such inspection results. The results can be digitally transmitted to the dispatch office or other entity. In an embodiment of the in-cab computing device 202 that includes a camera 708, the user can use the camera to photograph safety inspection points, to show compliance, to show some damage to the vehicle, and/or other points of interest. In one embodiment, an inspection application available on the in-cab computing device 202 utilizes the camera 708 to insert one or more digital pictures into the inspection record itself. When the driver returns the in-cab computing device 202 to the docking cradle 320, a dispatch message may be sent back to the dispatcher to provide the digital inspection report for that vehicle.

The in-cab computing device 202 includes a processor(s) 710, and storage/memory 712. The storage/memory 712 includes an operating system 714 and may include firmware 716. In one embodiment, the operating system 714 includes a Microsoft Windows™ 7 operating system.

The storage/memory 712 may store programs or other software for various applications or features provided by the in-cab computing device 202. For example, software may provide soft keys 718 and/or a soft keyboard 720 that may be utilized via a touchscreen 704 or other manner. Menus may also be provided, which operate similarly to soft keys, and therefore menu navigation is considered part of the soft keys 718. The storage/memory 712 may include software to facilitate network(s) communication, as depicted by network software module 722. Other representative software tools may include text-to-speech (T2S) 724, voice recognition 726, document readers and/or viewers 728, etc. Any number of applications may be implemented on the in-cab computing device 202, of which a few representative applications are depicted in FIG. 7A as the navigation application 730, scanning application 732, printing application 734, etc. Additional information on applications and software is provided below.

As previously noted, the in-cab computing device 202 includes one or more connectors or ports 300 to enable connection of the in-cab computing device 202 to the OBC 204, peripheral devices, etc. In the illustrated embodiment, the connectors 300 include one or more USB connectors/ports 308, one or more serial interface connectors such as the RS-232 306, RS-422 304 and IEEE-1394 736 connectors. Other interfaces may also or alternatively be provided, such as any number of different serial or parallel connection interfaces. Such interfaces enable connection to the OBC 204, which may be connected to receive vehicle engine data 749 via an IEEE-1394 748 or other interface. The interfaces may also or alternatively enable connection to any number of peripheral devices such as a keyboard 738, scanner 740, printer 742, speaker 744, fuel meter 746, etc. These and other devices may include any type of peripheral devices. For example, scanners 740 may include flatbed scanners, wand scanners, bar code scanners, radio frequency identification (RFID) scanners, etc. Thus, the identified peripheral devices is intended to be representative of the types of peripherals that may be coupled to the in-cab computing device 202, and is not intended to be limiting.

The speaker 744 peripheral may refer to any audio external to the in-cab computing device 202 itself. For example, fleets may have urgent messages that the driver will need to hear clearly while driving in a hands-free environment. Further, drivers do not want to miss critical turn-by-turn voice navigation instructions. Other applications may provide sound, in which a more robust audio system may be desirable. In such cases, audio options are available. One speaker option is a USB plug-and-play, where another is an integration of audio with the in-cab stereo system. For example, a fleet manager or driver may purchase aftermarket USB-powered speaker peripheral, which can be plugged into the in-cab computing device USB, or the docking station USB port where a docking station is used, and the speaker(s) will work upon its recognition by the in-cab computing device.

It should be recognized that the connections shown in FIG. 7A to peripheral devices need not be directly connected to the in-cab computing device 202. As previously described, a docking station 320 may be utilized. The connections and peripheral devices shown in FIG. 7A may be implemented with or without a docking station.

Figure 7B:
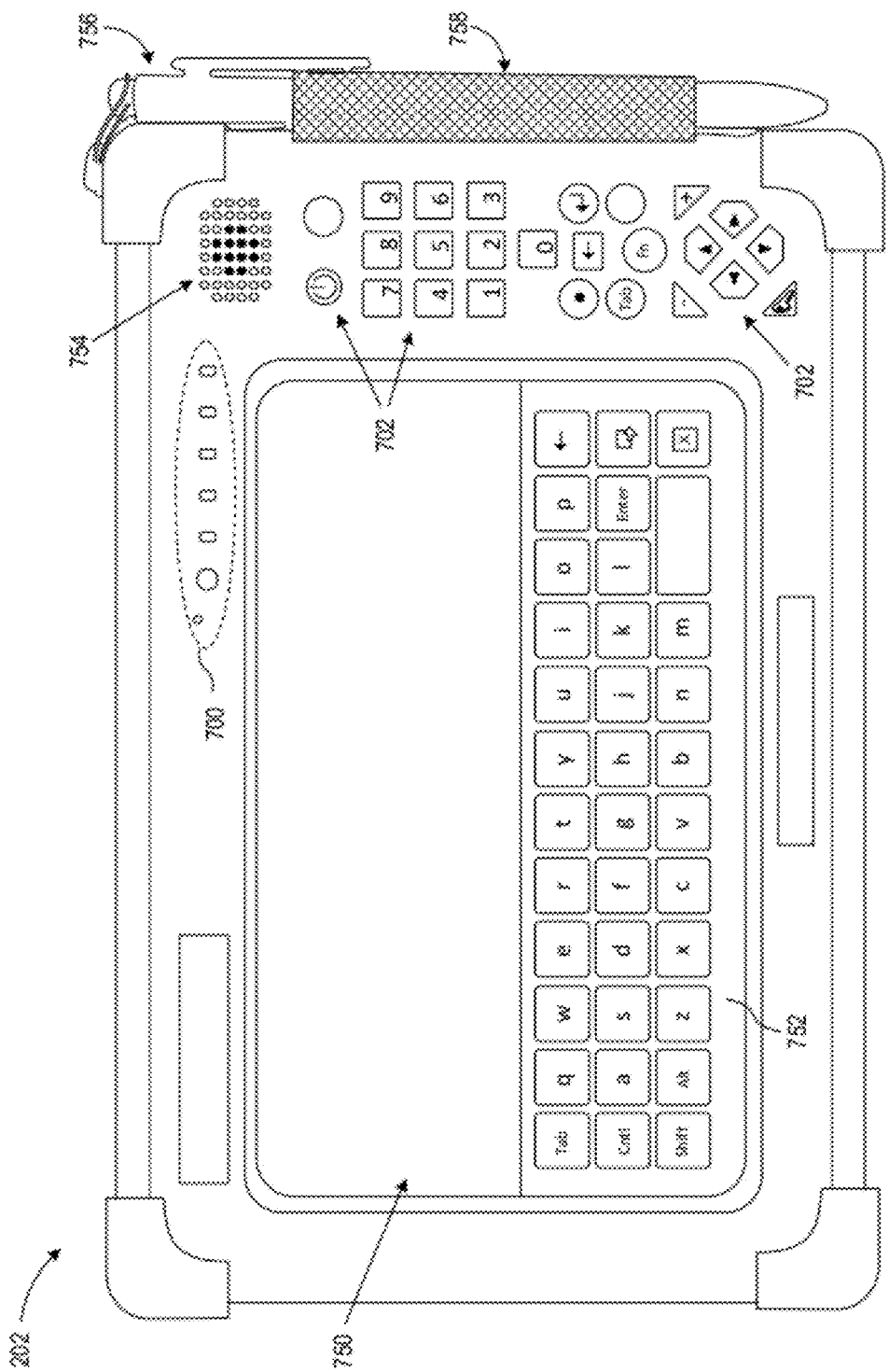
FIG. 7B illustrates an example of a form factor and representative layout of an in-cab computing device.

FIG. 7B illustrates an example of a form factor and representative layout of an in-cab computing device 202. The device may include one or more indicators 700 and numerous user input mechanisms 702. For example, the user input mechanisms 702 may include power buttons, numeric keypad, directional/navigation buttons and/or other specific or configurable mechanisms. One or more buttons may invoke barcode scanning and/or camera capture functionality while the user is in the ICAP software within a feature that allows barcode scanning or camera feature. Other keys may include a decimal point key, backspace button, enter button, and tab button. A function button provides access to secondary operation of some buttons. Another button may be functional while the user is in a third party application, where pressing the button while in the third party application directs the user to the ICAP software where the user left off to go to the third party application. For example, if the user is in the PACOS™ Trip list and the navigation application is launched, clicking this button while in the navigation application shall direct the user back to the same screen in the PACOS Trip list where the user was prior to going to the navigation application. These are merely representative of the types of hard keys that may be implemented.

The representative device 202 includes a display 750, which in one embodiment also serves as a touchscreen for user input. For example, in the illustrated embodiment, the "soft keyboard" 752 is presented on part of the display 750, and is presented by way of software 720 being executed via the processor 710 (FIG. 7A). The soft keyboard 752 is movable in one embodiment, such that it is allowed to float or otherwise move around the display screen. The soft keyboard may be configured in numerous ways, such as soft keyboard theme and/or color, how keys are presented, keyboard type (e.g. which alpha/numeric characters), soft keyboard disappearance delay, soft keyboard zooming and typing aids, configurations for floating on-screen soft keyboard (e.g. transparency, visible versus hidden, etc.), dictionary use configurations, language bar configurations, configurable shortcut icons, sounds, and the like.

Similarly, soft keys can be presented on the display 750, such as providing one or more selectable graphical items. For example, soft keys can be used to elicit certain actions, such as in a messaging application, from the message list in the inbox the driver may be provided on-screen options to save, reply, delete or view a message. Soft keys and soft keyboard as used herein generally refers to user input facilitated by software, e.g. via the display 750 and touchscreen 704, versus a discrete hardware component.

Figure 8:
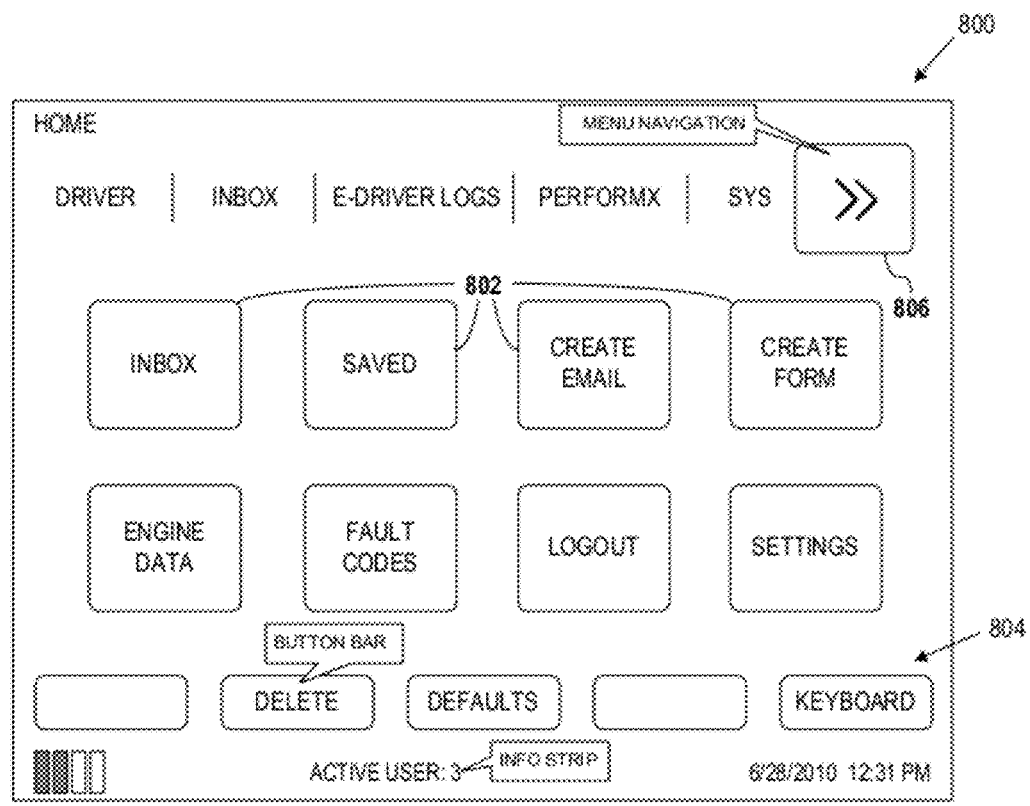
FIG. 8 illustrates an example display that presents at least selectable icons, a button bar 804, and menu navigation initiation.

In one embodiment a button bar is provided on the touchscreen that includes buttons for soft keys and soft keyboard. FIG. 8 illustrates an example display 800 that presents at least selectable icons 802, a button bar 804, and menu navigation initiation 806. Selecting a selectable icon 802 initiates a feature identified by that icon. The button bar 804 provides buttons such as a "delete" button, and also a "keyboard" button that provides at least one manner for opening the soft keyboard. Selection of the menu navigation button 806 opens a menu that can be navigated to locate desired applications, features, tools, etc.

Returning to FIG. 7B, the in-cab computing device 202 may also include a built-in speaker(s) 754, although some embodiments enable connection to peripheral speakers as well. One embodiment also includes a stylus 756, which in one embodiment is a tethered stylus 756 that can be temporarily housed in the stylus sheath 758 when on in use.

As merely an example, one embodiment of such an in-cab computing device 202 may include any of the following features and/or capabilities: a Windows™ 7 operating system, a processor, storage such as a solid state device (e.g. FLASH) or hard drive, RAM or other memory, 7-inch screen with 800×600, 1024×600 or other resolution, one or more USB ports, one or more serial ports, ethernet connection, one or more secure digital (SD) slots, touchscreen, programmable keys, soft keyboard, pen/stylus, signature capture, bar code scanner, camera, wifi, other wireless such as Bluetooth, etc. These features/capabilities merely identify a representative in-cab computing device 202, and is clearly not limited to the particular examples set forth above.

As noted above, the in-cab computing device 202 is capable of executing software to provide applications and services to drivers, fleet managers, dispatch entities, etc. Examples of applications include over-the-air programming (OTAP), messaging, eDriver Logs®, login/logout, vehicle management systems such as PerformX and other vehicle management, PACOS™, diagnostics, ICAP software developer's kit (SDK), speed monitoring, remote vehicle shutdown, onboard event recording, lane departure notifications, automated workflow, automatic vehicle location, in-cab navigation, in-cab scanning, in-cab training, and extended language support to name a representative few. Other exemplary software capabilities include voice recognition, including commands for application functions (e.g. change duty status, change trailer number, create message, play message, etc.), and calling up applications by name.

Some sample applications are now described in greater detail, which illustrates some representative advantages of the in-cab computing device and/or associated system described herein. For purposes of illustration, the examples assume a portable in-cab computing device which is connected to the OBC and other components/peripherals via the docking station described herein. Thus, the in-cab computing device may be used as a portable computing device when outside the truck/vehicle cab.

A first exemplary application involves safety inspections. One common task performed by drivers, particularly commercial drivers, is a pre-drive vehicle safety inspection. Prior to starting his/her drive at the beginning of a trip, the driver walks around the truck and trailer to visually inspect the vehicle for safety issues (e.g. broken tail lights, worn tires, trailer damage, etc.). Typically, this information is recorded on a paper form which is then later given to the trucking company office to record that the inspection was accomplished and to note any repairs that need to be done to the vehicle. The in-cab computing device enables this process to be automated by, for example, allowing the driver to remove the in-cab computing device from the cradle in the cab and use it to digitally record the information as he/she performs the inspection. The application software on the in-cab computing device may display the required inspection criteria along with providing the ability to indicate a pass/fail status and additional notes regarding the inspection. After the inspection, when the in-cab computing device is inserted into the dock in the truck cab, this information will be automatically sent to the trucking dispatch office for permanent record and/or be used to notify the maintenance department of necessary repairs to the vehicle. Thus, rather than using paper to record the inspection, the in-cab computing device enables the process to be automated, providing the captured data to the back office in a digital form that can be immediately stored in a database without further user intervention. As previously noted, the in-cab computing device may also be equipped with a camera to take digital photographs of items associated with an inspection, and such digital pictures may optionally be included directly into the inspection report for transmission to the ultimate destination.

Another exemplary application involves damaged goods on delivery. Occasionally during a delivery of goods by a truck, damage to the items being delivered can occur while in transit. Typically, this is discovered at the point of delivery as the truck is being unloaded. Once any product damage is discovered, the driver typically needs to record the description of the damage on a paper form and submit it to the dispatch office for communication to the customer and/or to process insurance claims for the product that was damaged. The in-cab computing device automates this process by allowing the driver to digitally record any information regarding damage as it is observed. Additionally, through the use of the internal digital camera on the in-cab computing device, the driver will be able to include an actual photograph of the damaged item that can be used to supplement the written description of the damage. After recording the data, when the in-cab computing device is inserted into the dock back in the truck cab, this information will be automatically sent to the trucking dispatch office for permanent record and/or processing by the firm's insurance claims department.

Still another exemplary application involves police officer inspection of DOT logs. The system provides automatic recording of Department of Transportation (DOT) driver information, such as the number of hours driven, rest periods, off-duty time, etc. Federal and state laws dictate the amount of time that a particular driver can operate between rest breaks, and logs must be kept to indicate compliance in this area. The system disclosed herein automates this task by logging time, distance, driver data, etc., in a digital database on the onboard computer. The in-cab computing device enables the driver to produce the information if/when pulled over by an enforcement officer, by removing the in-cab computing device from the cradle and presenting it to the officer outside the truck cab. Typically, the driver might be asked to sit in the police car while the officer reviews the DOT data. All recorded DOT logging data is available to the officer in this situation, allowing the officer to verify compliance. When the inspection is finished, the driver can return to the truck cab and plug the in-cab computing device back into the cradle to resume his/her trip. Thus, the driver can illustrate DOT compliance to an officer, even while outside the cab of the truck.

A text-to-speech (T2S) application is also provided in the in-cab computing device in one embodiment. An exemplary use scenario involves a non-driving situation, where the driver accesses the messaging inbox with a T2S shortcut visible on the navigation element proximate the message list. The driver's focus is on the first message in the inbox, which is not a forced replay, and presses the T2S shortcut. The message opens to the message view and T2S begins to read the message starting with the header information. The message header and content are read with proper enunciation for day, date, and time, acronyms, industry terms, etc.

Another exemplary use scenario involves driving while in "safe mode." At their option, fleets or drivers can choose to make selected functions unavailable while the vehicle is in motion, keeping driver attention on the road. This is generally referred to herein as "safe mode" options. While driving and in safe mode, a driver may be alerted that a new mail message has arrived with an audible indication, and/or seeing the increment on screen in the "New Messages" section, etc. The driver can, for example, press an in-cab computing device hard key to begin playing the message, such as the oldest unread message in the inbox. T2S begins to read the message starting with the header information. When the driver listens to the message completely, the message becomes available for replay in one embodiment.

Another exemplary use scenario again involves driving in safe mode, where a GPS/navigation application is running with a route in progress. The driver plays a message, and while the message is being read, the navigation application provides voice instruction for an upcoming turn to the driver. The message is paused while the navigation application comes to the foreground above safe mode. Once the navigation application completes the voice instruction, the driver resumes the message playback by, for example, pressing the play button in safe mode. In order to bring safe mode back to the foreground, in one embodiment the driver presses any hard key and then presses the designated in-cab computing device hard key.

Another exemplary use scenario involves a driver playing a new message while driving in safe mode. The driver has no other unread messages in the inbox after playing the new message. His/her safe mode screen updates to remove the "play" option and remove visibility to the unread message count. Replay remains available to allow the driver to replay the message that was last read. In another similar use scenario, the driver has played a new message while in safe mode, but has other unread messages in the inbox after playing the message. His/her safe mode screen decrements the unread message count available for reading. "Play" and "replay" functions may already available. In one embodiment, "replay" allows the driver to replay the last message read. In yet another scenario, a driver has received no new messages while driving in safe mode. The driver has no unread messages in his/her inbox prior to entering safe mode. In this scenario, Replay is the only option available to play the most recent read message in the inbox. These use scenarios are simply intended to provide representative examples of how the T2S application can be used with the in-cab computing device.

Third party applications are also supported on the in-cab computing device. For example, a fleet manager can subscribe to a third party application, such as the NAVIGO In-Cab Navigation application, PRO-TREAD In-Cab Training application, In-Cab Scanning (e.g. TRIPPAK), BLU-LINK, etc. Fleet managers, drivers or others subscribe to each third party application as desired. The in-cab computing devices may be updated with third party applications via OTAP, USB stick, and/or other manners.

Further, the in-cab computing device may have multiple applications running concurrently. Thus, a driver may wish to have some combination of applications running concurrently, and may call up applications in an order to achieve a desired workflow. For example, the driver may stop his/her truck within the arrived radius of PACOS™ stop. The driver is using PeopleNet's eDriver Logs®, and an auto-duty status change ("ADSC") occurs from driving to on-duty. The driver acknowledges the ADSC notification, but allows the "arrive" GUF to time out as "yes, I have arrived." She is prompted by the navigation application to route her to the next stop, where she selects "yes" and a route-to-stop request kicks off from PACOS to the navigation application. She is prompted with her PACOS embedded form with pre-populated information that is forced reply. The driver delivers her load, enters the PACOS form information, and sends it. She then brings up a scanning application and begins scanning documents. She indexes these images in the cab because the scanning application is integrated to the PACOS SDK, and then she transmits those images. The driver is done at this stop location and brings up the navigation application because her route to her next stop is awaiting her already (from the earlier route request, so she doesn't have to ask again). The driver pulls away and the PACOS depart occurs in the background, the navigation application speaks turn-by-turn directions, and the scanning application transaction has been confirmed.

Figure 9:
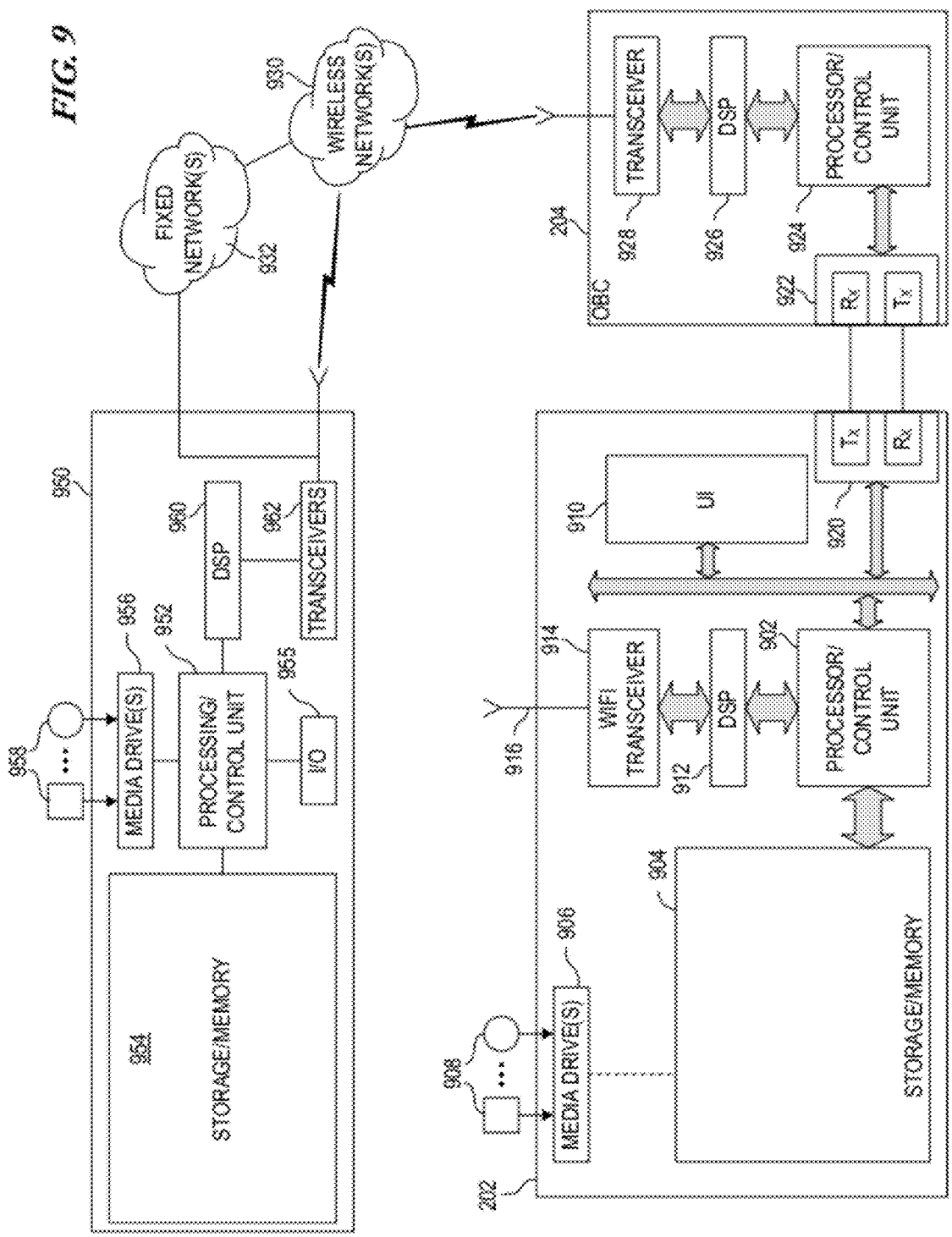
FIG. 9 is a diagram illustrating a representative system in which the in-cab computing device may be utilized.

A representative system in which the in-cab computing device 202 may be utilized is shown in FIG. 9. The in-cab computing device 202 includes a processing/control unit 902, such as a microprocessor, reduced instruction set computer (RISC), or other central processing module. The processing unit 902 need not be a single device, and may include one or more processors. For example, the processing unit may include a master processor and one or more associated slave processors coupled to communicate with the master processor.

The processing unit 902 controls the basic functions of the in-cab computing device as dictated by programs available in the program storage/memory 904. Examples of software, programs, applications, operating systems and other code was described in connection with FIG. 7A. Thus, the program storage/memory 904 may include an operating system and program modules for carrying out functions and applications on the in-cab computing device. For example, the program storage may include one or more of read-only memory (ROM), flash ROM, programmable and/or erasable ROM, random access memory (RAM), subscriber interface module (SIM), wireless interface module (WIM), smart card, disk, CD-ROM, DVD, or other resident or removable memory device. One or more media drives 906 may be provided to receive and/or store information on media 908 such as CD-ROM, DVD, removable memory devices, etc. The modules or other software operable with the processing unit 902 to perform functions in accordance with the disclosure may also be transmitted to the in-cab computing device 202 via data signals, such as being downloaded electronically via a network, such as the Internet.

The processor 902 is also coupled to user-interface 910 elements associated with the in-cab computing device. The user-interface 910 may include, for example, a keyboard/keypad, speaker, microphone, and/or other mechanisms described herein. These and other user-interface components are coupled to the processor 902 as is known in the art. Alternatively, other user-interface mechanisms may be employed, such as voice commands, switches, touch pad/screen, graphical user interface using a pointing device, trackball, joystick, and/or any other user interface mechanism.

The in-cab computing device 202 may also include a digital signal processor (DSP) 912 that may perform a variety of functions, including analog-to-digital (A/D) conversion, digital-to-analog (D/A) conversion, speech coding/decoding, encryption/decryption, error detection and correction, bit stream translation, filtering, etc. The transceiver 914, generally coupled to an antenna 916, transmits and receives the wireless LAN or other wifi signals in a WLAN environment. Similar transmitters/receivers (e.g. transceivers) may further be provided for other communication mechanisms, such as Bluetooth transceivers, GPS receivers, etc. The in-cab computing device 202 may also include a transceiver or other interface to communicate data directly via wired technologies, such as USB, IEEE-1394, etc., as was previously described.

Additionally, a receiver ($R_X$) may be provided to receive information from a transmitter ($T_X$) of the onboard computer 204. As previously noted, such connection may be by way of a docking station, although the docking station is not shown in FIG. 9. The in-cab computing device may also provide information from its transmitter ($T_X$) to the receiver ($R_X$) of the onboard computer 204. In one embodiment, the connection between transceivers 920, 922 is accomplished via an RS-422 or RS-232 connection, although other connections may be implemented.

The illustrated onboard computer 204 communicates with cellular, satellite and other mobile/wireless networks 930 on behalf of the in-cab computing device, although in other embodiments the in-cab computing device may include cellular communications technology itself. In the illustrated embodiment, the onboard computer 204 includes a processor 924, DSP 926 and transceiver 928 to communicate via the cellular or other wireless networks 930.

FIG. 9 also depicts a representative computing system 950 operable on the network, such as the communication servers at a data center of a dispatch entity, mobile communication company, etc. Thus, the computing arrangement 950 represents any computing system in which the OBC 204 and/or in-cab computing device 202 communicate with.

The computing system(s) 950 may be communicated with via the wireless network(s) 930 and/or fixed network(s) 932. In one embodiment, the computing system 950 represents at least communication servers and associated computing power to collect, aggregate, process and/or present data associated with call records received from the vehicles. The system 950 may be a single system or a distributed system.

The illustrated computing system 950 includes a processing arrangement 952, such as one or more processors, which are coupled to the storage/memory 954. The processor 952 carries out a variety of standard computing functions as is known in the art, as dictated by software and/or firmware instructions. The storage/memory 954 may represent firmware, media storage, memory, etc.

The processor 952 may communicate with other internal and external components through input/output (I/O) circuitry 955. The computing system 950 may also include media drives 956, such as hard and floppy disk drives, CD-ROM drives, DVD drives, and other media 958 capable of reading and/or storing information. In one embodiment, software for carrying out the operations at the computing system 950 may be stored and distributed on CD-ROM, diskette, magnetic media, removable memory, or other form of media capable of portably storing information, as represented by media devices 958. Such software may also be transmitted to the system 950 via data signals, such as being downloaded electronically via a network such as the data network 932, Local Area Network (LAN) (not shown), wireless network 930, and/or any combination thereof. The storage/memory 954 and/or media devices 958 store the various programs and data used in connection with the present invention.

The illustrated computing system 950 may also include DSP circuitry 960, and at least one transceiver 962 (which is intended to also refer to discrete transmitter/receiver components). The server 950 and transceiver(s) 962 may be configured to communicate with one or both of the fixed network 932 and wireless network 930.

Figure 10:
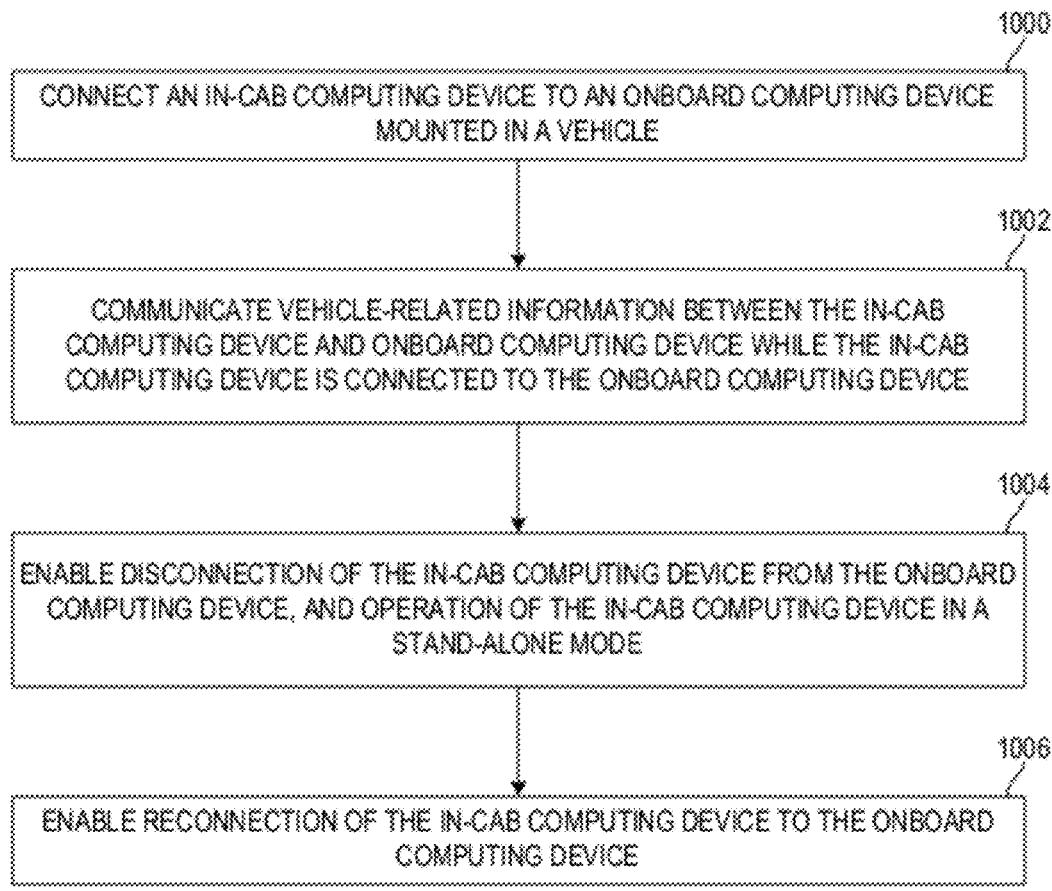
FIG. 10 is a flow diagram illustrating a representative method in which the in-cab computing device serves as a multi-mode vehicle computing device supporting both in-cab and stand-alone operation.

As noted herein, the in-cab computing device is removably connectable to the onboard computing device. FIG. 10 is a flow diagram illustrating a representative method in which the in-cab computing device serves as a multi-mode vehicle computing device supporting both in-cab and stand-alone operation. An in-cab computing device is connected 1000 to an onboard computing device that is mounted in a vehicle. Vehicle-related information is communicated 1002 between the in-cab computing device and onboard computing device while the in-cab computing device is connected to the onboard computing device. The in-cab computing device can be disconnected 1004 from the onboard computing device, and operation of the in-cab computing device is enabled in a stand-alone mode to execute applications independently of operation with the onboard computing device. The in-cab computing device can be reconnected 1006 to the onboard computing device to re-establish cooperative operations between the in-cab computing device and onboard computing device.

Hardware, firmware, software or a combination thereof may be used to perform the functions and operations described herein. Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device.

From the description provided herein, those skilled in the art are readily able to combine software created as described with appropriate general purpose or special purpose computer hardware to create a computing system and/or computing subcomponents embodying the invention, and to create a computing system(s) and/or computing subcomponents for carrying out the method(s) of the invention.

It should be recognized that while features of the OBC and in-cab computing device have been described herein as discrete components, the functionality may be combined in accordance with embodiments of the invention.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method comprising:
    connecting an in-cab computing device to an onboard computing device mounted in a vehicle, the in-cab computing device capable of being operated in a connected mode and a stand-alone mode;
    collecting driver log data at the onboard computing device, the driver log data comprising data used by an electronic driver log application operating on the in-cab computing device to maintain an electronic driver log for compliance with governmental transportation regulations, the electronic driver log application having rules;
    updating the rules based on a determination that a geographic boundary has been crossed;
    communicating the driver log data between the onboard computing device and the in-cab computing device while the in-cab computing device is connected to the onboard computing device while being operated in the connected mode;
    logging the driver log data in the electronic driver log on the in-cab computing device using the electronic driver log application on the in-cab computing device according to the rules of the electronic driver log application;
    using the in-cab computing device as a user interface of the onboard computing device while being operated in the connected mode;
    facilitating disconnection of the in-cab computing device from the onboard computing device and operating the in-cab computing device in the stand-alone mode;
    executing the electronic driver log application on the in-cab device independently from the onboard computing device while being operated in the stand-alone mode;
    queuing the driver log data at the onboard computing device in response to the in-cab computing device being disconnected from the onboard computing device;
    facilitating reconnection of the in-cab computing device to the onboard computing device;
    transmitting the queued driver log data to the in-cab computing device upon a determination that the in-cab computing device has been reconnected to the onboard computing device, the queued driver log data comprising events and the queued events are provided to the in-cab computing device in an order in which they occurred;
    updating the electronic driver log with the transmitted queued driver log data using the electronic driver log application on the in-cab computing device;
    embedding one or more digital photographs into an inspection report created by an application executed while the in-cab computing device is disconnected from the onboard computing device and operating in the stand-alone mode; and
    automatically sending the inspection report to a central office upon reconnection of the in-cab computing device with the onboard computing device.

2. The method of claim 1, wherein:
    connecting the in-cab computing device to an onboard computing device mounted in a vehicle comprises connecting the onboard computing device to a docking station, and removably plugging the in-cab computing device into the docking station;
    facilitating disconnection of the in-cab computing device from the onboard computing device comprises enabling removal of the in-cab computing device from the docking station; and
    facilitating reconnection of the in-cab computing device to the onboard computing device comprises enabling insertion of the in-cab computing device into the docking station to reconnect the in-cab computing device and the onboard computing device.

3. The method of claim 1, connecting an in-cab computing device to an onboard computing device mounted in a vehicle comprises connecting the in-cab computing device and onboard computing device via a wired connection.

4. The method of claim 1, connecting an in-cab computing device to an onboard computing device mounted in a vehicle comprises connecting the in-cab computing device and onboard computing device via a wireless connection.

5. The method of claim 4, wherein the wireless connection comprises a wireless local area connection including at least the onboard computing device and the in-cab computing device.

6. A system comprising:
    an in-cab computing device configured to be operated in a connected mode and a stand-alone mode and an onboard computing device having a first processor configured to collect driver log data, the driver log data used by an electronic driver log application operating on the in-cab computing device to maintain an electronic driver log for compliance with governmental transportation regulations, the onboard computing device having a transceiver configured to communicate at least some of the data over one or more networks to one or more destination entities, the first processor configured to communicate the driver log data between the onboard computing device and the in-cab computing device while the in-cab computing device is connected to the onboard computing device while being operated in the connected mode, wherein the electronic driver log application is executable by a second processor and is configured to log the driver log data on the in-cab computing device and to operate independently from the onboard computing device while being operated in the stand-alone mode, the electronic driver log application having rules, wherein the second processor is configured to log the driver log data according to the rules of the electronic driver log application;

a positioning system configured to collect geographic location data, wherein the second processor is configured to update the rules based on a determination that a geographic boundary has been crossed, the in-cab computing device comprising:
- at least one disconnectable connection to the onboard computing device to communicate information between the in-cab computing device and the onboard computing device while being operated in the connected mode, the first processor configured to determine when the at least one disconnectable connection to the onboard computing device has been disconnected and direct the driver log data targeted for the in-cab computing device to be queued in response to the determination that the at least one disconnectable connection has been disconnected;
- a transmitter configured to transmit the queued driver log data to the in-cab computing device upon a determination that the at least one disconnectable connection has been reconnected to the onboard computing device, the queued driver log data comprising events and the queued events are provided to the in-cab computing device in the order in which they occurred, the first processor configured to update the electronic driver log with the transmitted queued driver log data using the electronic driver log application on the in-cab computing device;
- a user interface configured to be used as a user interface for the onboard computing device while being operated in the connected mode and a user interface for the in-cab computing device while being operated in the stand-alone mode; and
- a camera, the in-cab computing device configured to:
  - embed one or more digital photographs obtained via the camera into an inspection report created by an application executed while the in-cab computing device is disconnected from the onboard computing device and operating in the stand-alone mode; and
  - automatically send the inspection report to a central office upon reconnection of the in-cab computing device with the onboard computing device.

7. The system of claim 6, wherein the first processor is configured to collect vehicle-related data comprising any one or more of geographic location data, odometer readings, RPM, speed, calculated miles per gallon of fuel consumed, engine idle time, engine hours door lock status, and windshield wiper status.

8. The system of claim 6, wherein the in-cab computing device further comprises one or more connectors to enable connection of one or more peripheral devices to the in-cab computing device.

9. The system of claim 6, further comprising a docking station coupled to the onboard computing device, and configured to removably couple the in-cab computing device to the onboard computing device.

10. The system of claim 9, wherein the docking station further comprises one or more connectors to enable connection of one or more peripheral devices to the in-cab computing device.

11. The system of claim 6, wherein the first processor is configured to collect driver data comprising one or more of identity of the driver, number of hours driven, rest periods, and off-duty time.

* * * * *